US008567958B2

(12) United States Patent
Cudak et al.

(10) Patent No.: US 8,567,958 B2
(45) Date of Patent: Oct. 29, 2013

(54) ORGANIZING PROJECTIONS ON A SURFACE

(75) Inventors: Gary D. Cudak, Research Triangle Park, NC (US); Christopher J. Hardee, Research Triangle Park, NC (US); Randall C. Humes, Research Triangle Park, NC (US); Heather C. Miller, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 403 days.

(21) Appl. No.: 13/050,327

(22) Filed: Mar. 17, 2011

(65) Prior Publication Data
US 2012/0236038 A1    Sep. 20, 2012

(51) Int. Cl.
G03B 21/00 (2006.01)
G03B 21/26 (2006.01)
G03B 21/56 (2006.01)
G03B 21/60 (2006.01)
G06F 3/038 (2013.01)
G09G 5/00 (2006.01)
G09G 5/02 (2006.01)

(52) U.S. Cl.
USPC ............... 353/30; 353/31; 353/94; 359/443; 359/446; 359/452; 345/207; 345/667; 345/682

(58) Field of Classification Search
USPC .............. 353/30–31, 69–70, 94; 359/443, 359/446–447, 452; 345/207, 619, 660, 667, 345/672, 682, 698
See application file for complete search history.

(56) References Cited

U.S. PATENT DOCUMENTS

| 7,284,866 | B2 * | 10/2007 | Buchmann | 353/42 |
|---|---|---|---|---|
| 7,564,501 | B2 * | 7/2009 | Miyazawa | 348/383 |
| 2002/0093626 | A1 * | 7/2002 | Asamura | 353/30 |
| 2008/0143969 | A1 * | 6/2008 | Aufranc et al. | 353/30 |
| 2009/0091714 | A1 * | 4/2009 | Aufranc et al. | 353/70 |
| 2011/0176066 | A1 * | 7/2011 | Chen | 348/744 |
| 2011/0216284 | A1 * | 9/2011 | Chae et al. | 353/30 |
| 2011/0249019 | A1 * | 10/2011 | Chen | 345/593 |
| 2012/0320200 | A1 * | 12/2012 | Majumder et al. | 348/143 |

OTHER PUBLICATIONS

Saabedra, Humberto, AT & T Launches LG eXpo Windows Mobile Projector Phone, http://www.phonenews.com/att-launches-lg-expo-windows-mobile-device-9806/, Dec. 17, 2009.
Hilal, Al, CVSL-112 Projection Phone, http://www.trendygadget.com/2008/09/24/cvs1-112-projection-phone/, Sep. 24, 2008.

(Continued)

*Primary Examiner* — Tony Ko
*Assistant Examiner* — Jori S Reilly-Diakun
(74) *Attorney, Agent, or Firm* — Kunzler Law Group (57) ABSTRACT

An apparatus, system, and method are disclosed for managing projection areas on a surface. A search module is configured to search for one or more markers defining one or more projection areas on a surface. An area module is configured to select a usable projection area from the one or more projection areas on the surface. A boundary module is configured to determine a boundary for the usable projection area. A constraint module is configured to constrain a projection from a projector onto the surface within the boundary of the usable projection area in response to the boundary module determining the boundary of the usable projection area.

19 Claims, 5 Drawing Sheets

(56) References Cited

OTHER PUBLICATIONS

N70 Projector Phone, http://www.cectcellphone.com/product.php?id_product=519/519-N70%20Projector%20phone.html, Reviewed by IBM Inventor on Jan. 18, 2011.

Artuji, LG Projector Phone Unveiled, http://www.artuji.com/lg-projector-phone-unveiled/3071, Reviewed by IBM Inventor on Jan. 18, 2011.

Ricker, Thomas, Samsung AMOLED Beam SPH-W9600 projector phone is not what we've been waiting for, http://www.engadget.com/2010/04/14/samsung-amoled-beam-sph-w9600-projector-phone-is-not-what-weve/, Apr. 14, 2010.

Picoprojector-Info.Com, Projector Phone, http://www.picoprojector-info.com/projector-phone, Reviewed by IBM Inventor on Jan. 18, 2011.

Mistry, Pranav, Sixthsense—Integrating information with the real world, http://www.pranavmistry.com/projects/sixthsense/, 2010.

* cited by examiner

ORGANIZING PROJECTIONS ON A SURFACE

FIELD

The subject matter disclosed herein relates to managing one or more projections on a surface.

BACKGROUND

Description of the Related Art

Devices that project images onto a surface are becoming increasingly common and affordable. For example, some portable devices project a display in addition to (or instead of) providing a display on a built in monitor. Surfaces such as walls in public or private spaces may be ideal locations for users to project the display.

As projection devices become increasingly common, managing the space available for projectors to use becomes an issue. A manager may want to designate only certain spaces as being available for projection. Where multiple people are projecting onto the same surface, maintaining and managing appropriate boundaries may also be important.

BRIEF SUMMARY

The apparatus is provided with a plurality of modules configured to execute the necessary steps for managing projections. These modules, in the described embodiments, include a search module, an area module, a boundary module, and a constraint module.

The search module searches for one or more markers defining one or more projection areas on a surface. The area module selects a usable projection area from the one or more projection areas on the surface. The boundary module determines a boundary for the usable projection area, and the constraint module constrains a projection from a projector onto the surface within the boundary of the usable projection area in response to the boundary module determining the usable projection area.

A system of the present invention is also presented. The system may be embodied using a system controller, a search module, an area module, a boundary module, and a constraint module. The system controller manages a plurality of projection areas on a surface. Each of the plurality of projection areas is defined by one or more markers. The search module searches for the one or more markers. The area module selects a usable projection area of the plurality of projection areas. The system controller identifies to the area module the one or more markers that define the usable projection area. The boundary module determines a boundary for the usable projection area as defined by the one or more markers that define the usable projection area. The constraint module constrains a projection from a projector onto the surface within the boundary for the usable projection area in response to the boundary module determining the boundary for the usable projection area.

A method of the present invention is also presented for managing projection areas on a surface. The method in the disclosed embodiments substantially includes the steps necessary to carry out the functions presented above with respect to the operation of the described apparatus and system. In one embodiment, the method includes requesting a usable projection area from a system controller. The method may include receiving, from the system controller, the markers that define the usable projection area. The method may further involve searching the surface for the markers that define the usable projection area. The method may include selecting the usable projection area from one or more projection areas on the surface using the one or more markers that define the usable projection area. The method may include determining the boundary for the usable projection area, and may also include constraining a projection from a projector onto the surface within the boundary of the usable projection area.

References throughout this specification to features, advantages, or similar language do not imply that all of the features and advantages may be realized in any single embodiment. Rather, language referring to the features and advantages is understood to mean that a specific feature, advantage, or characteristic is included in at least one embodiment. Thus, discussion of the features and advantages, and similar language, throughout this specification may, but do not necessarily, refer to the same embodiment.

Furthermore, the described features, advantages, and characteristics of the embodiments may be combined in any suitable manner. One skilled in the relevant art will recognize that the embodiments may be practiced without one or more of the specific features or advantages of a particular embodiment. In other instances, additional features and advantages may be recognized in certain embodiments that may not be present in all embodiments.

These features and advantages of the embodiments will become more fully apparent from the following description and appended claims, or may be learned by the practice of embodiments as set forth hereinafter.

BRIEF DESCRIPTION OF THE DRAWINGS

In order that the advantages of the embodiments of the invention will be readily understood, a more particular description of the embodiments briefly described above will be rendered by reference to specific embodiments that are illustrated in the appended drawings. Understanding that these drawings depict only some embodiments and are not therefore to be considered to be limiting of scope, the embodiments will be described and explained with additional specificity and detail through the use of the accompanying drawings, in which.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of computer readable program code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of computer readable program code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the computer readable program code may be stored and/or propagated on in one or more computer readable medium(s).

The computer readable medium may be a tangible computer readable storage medium storing the computer readable program code. The computer readable storage medium may be, for example, but not limited to, an electronic, magnetic, optical, electromagnetic, infrared, holographic, micromechanical, or semiconductor system, apparatus, or device, or any suitable combination of the foregoing.

More specific examples of the computer readable medium may include but are not limited to a portable computer diskette, a hard disk, a random access memory (RAM), a read-only memory (ROM), an erasable programmable read-only memory (EPROM or Flash memory), a portable compact disc read-only memory (CD-ROM), a digital versatile disc (DVD), an optical storage device, a magnetic storage device, a holographic storage medium, a micromechanical storage device, or any suitable combination of the foregoing. In the context of this document, a computer readable storage medium may be any tangible medium that can contain, and/or store computer readable program code for use by and/or in connection with an instruction execution system, apparatus, or device.

The computer readable medium may also be a computer readable signal medium. A computer readable signal medium may include a propagated data signal with computer readable program code embodied therein, for example, in baseband or as part of a carrier wave. Such a propagated signal may take any of a variety of forms, including, but not limited to, electrical, electro-magnetic, magnetic, optical, or any suitable combination thereof. A computer readable signal medium may be any computer readable medium that is not a computer readable storage medium and that can communicate, propagate, or transport computer readable program code for use by or in connection with an instruction execution system, apparatus, or device. Computer readable program code embodied on a computer readable signal medium may be transmitted using any appropriate medium, including but not limited to wireless, wireline, optical fiber cable, Radio Frequency (RF), or the like, or any suitable combination of the foregoing.

In one embodiment, the computer readable medium may comprise a combination of one or more computer readable storage mediums and one or more computer readable signal mediums. For example, computer readable program code may be both propagated as an electro-magnetic signal through a fiber optic cable for execution by a processor and stored on RAM storage device for execution by the processor.

Computer readable program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The computer readable program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to," unless expressly specified otherwise. An enumerated listing of items does not imply that any or all of the items are mutually exclusive, unless expressly specified otherwise. The terms "a," "an," and "the" also refer to "one or more" unless expressly specified otherwise.

Furthermore, the described features, structures, or characteristics of the embodiments may be combined in any suitable manner. In the following description, numerous specific details are provided, such as examples of programming, software modules, user selections, network transactions, database queries, database structures, hardware modules, hardware circuits, hardware chips, etc., to provide a thorough understanding of embodiments. One skilled in the relevant art will recognize, however, that embodiments may be practiced without one or more of the specific details, or with other methods, components, materials, and so forth. In other instances, well-known structures, materials, or operations are not shown or described in detail to avoid obscuring aspects of an embodiment.

Aspects of the embodiments are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer readable program code. These computer readable program code may be provided to a processor of a general purpose computer, special purpose computer, sequencer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

The computer readable program code may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer readable program code may also be loaded onto a computer, other programmable data processing apparatus, or other devices to cause a series of operational steps to be performed on the computer, other programmable apparatus or other devices to produce a computer implemented process such that the program code which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions of the program code for implementing the specified logical function(s).

It should also be noted that, in some alternative implementations, the functions noted in the block may occur out of the order noted in the Figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated Figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer readable program code.

Figure 1:
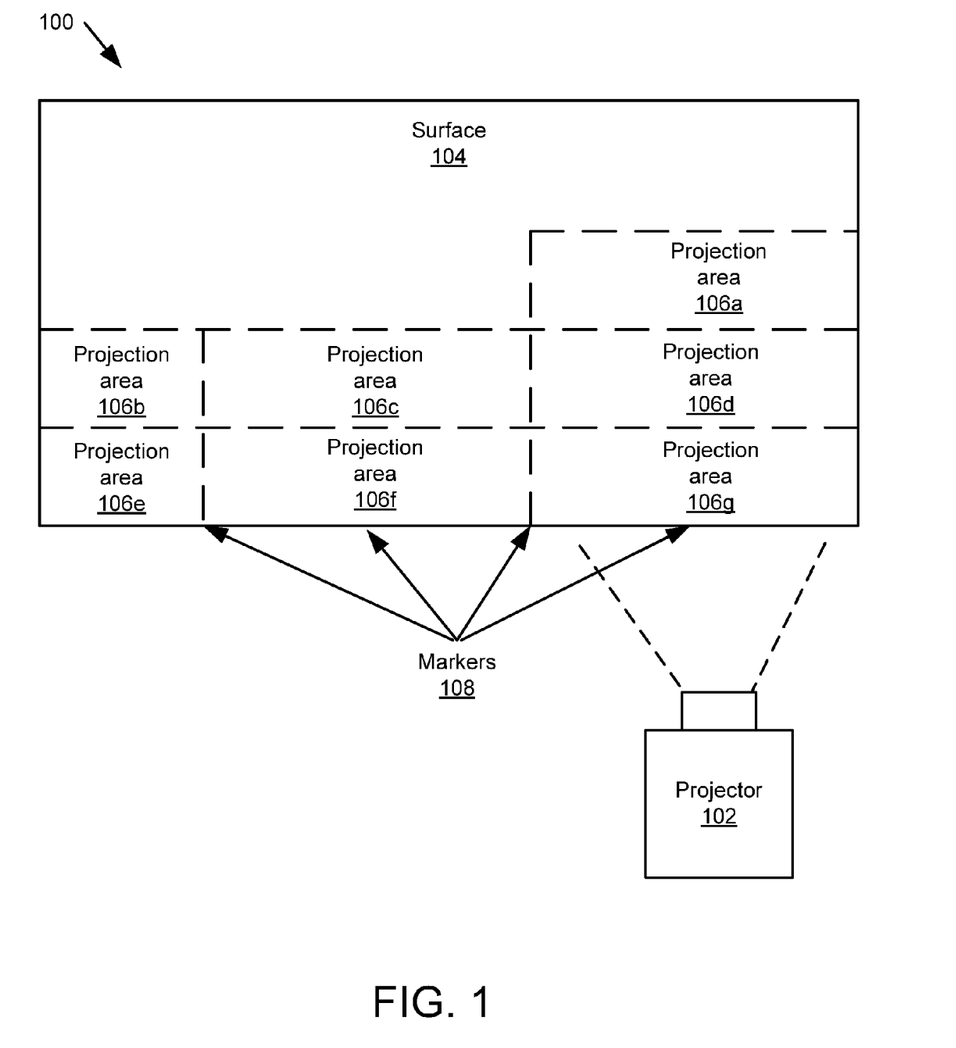
FIG. 1 is a schematic block diagram illustrating one embodiment of a surface and a projector.

FIG. 1 depicts an embodiment of a system 100 including a surface 104 and a projector 102. The surface 104 is any face of a body or thing. The surface 104 may be, for example, a wall, a partition, a table top, or a counter top. The surface 104 may be located in public or private spaces such as an airport, an office building, a classroom, or other location.

The projector 102 is a device that can throw images on a surface 104. The projector 102 may use a light source to create the images. The projector 102 may be designed to connect to an electronic device such as a laptop, mobile phone, or tablet and to project the display for the electronic device on the surface 104. The projector 102 may be integrated into an electronic device and may act as the primary display mechanism for the electronic device.

In certain embodiments, the projector 102 uses markers 108 to determine where to project on the surface 104. The markers 108 (represented by the dashed lines on the surface 104) define one or more projections areas 106 (such as projection areas 106a-g shown in FIG. 1) on the surface 104. The markers 108 may define the projection areas 106 by defining the boundaries for the projection areas 106. The markers 108 may define the projection areas 106 by identifying a point within the projection area 106 (such as the center). In certain embodiments, the markers 108 are part of the surface 104. For example, the markers 108 may be painted onto the surface 104.

The markers 108 may be created using materials that are not detectable by the human eye, but that can be detected by the projector 102 or other sensing device that may be in communication with the projector 102. The markers 108 may be devices that are built into the surface 104 and that are detectable by the projector 102; for example, the markers 108 may radiate at frequencies that are harmless but detectable to the projector 102. For example, the markers 108 may be created using light in the ultraviolet spectrum. In other embodiments, the markers 108 are created using light (whether visible or not) from another projector, as discussed in greater detail below. In yet other embodiments, the markers 108 are naturally occurring physical features of the surface 104 such as corners, edges, windows, and other features.

The markers 108, in certain embodiments, also include data that can be sent to the projector 102 from a system controller discussed further below. For example, in one embodiment, the markers 108 are made up of naturally occurring physical features and coordinate data sent by the system controller. In such embodiments, the projector 102 may determine the locations of the physical features and receive data from the system controller informing the projector 102 which section of the surface 104 is available to the projector 102. The markers 108 may also be created using a combination of the approaches described above.

In certain embodiments, markers 108 may be used to convey information about the particular projection area 106. For example, a marker 108 may be a watermark that indicates, when read by the projector 102, that the projection area 106 containing the watermark is not to be used for projection.

Projection area 106, as that term is used in this specification, refers to an area of the surface 104 that can be used for projection. The boundaries of a projection area 106 may be defined by physical features of the surface 104, by the markers 108, or by data about the location of the boundaries in relation to physical features of the surface 104, the markers 108, or both. Other approaches to defining the boundaries may also be used.

Figure 2:
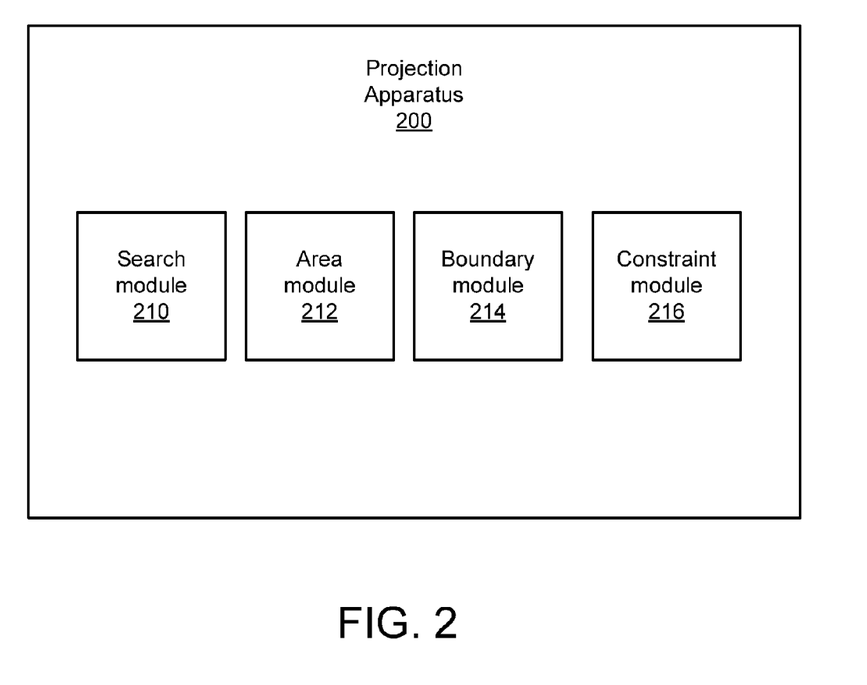
FIG. 2 is a schematic block diagram illustrating another embodiment of a surface and a projector.

FIG. 2 shows a second embodiment of a surface 104 with markers 108a-c and a projection apparatus 200. In the depicted embodiment, the projection apparatus 200 includes a search module 210, an area module 212, a boundary module 214, and a constraint module 216, which are described below.

The projection apparatus 200, in one embodiment, is embodied by a projector 102. In another embodiment, the projection apparatus 200 includes a projector 102 and one or more devices, such as a computer, a laptop computer, a tablet computer, a personal digital assistant ("PDA"), and the like. In various embodiments the projection apparatus 200 may include one or more other input devices, such as a camera 320, a scanner, a global positioning system ("GPS") unit, a radio frequency identifier ("RFID") detector, etc.

Note that all or part of the search module 210, the area module 212, the boundary module 214, and the constraint module 216 may be in the projection apparatus 200 or another electronic device in communication with the projection apparatus 200 and are shown in the projection apparatus 200 in the depicted embodiment for convenience. One of skill in the art will recognize other locations for the modules 210-216.

In FIG. 2, the markers 108a-c are each a unique pattern on the surface 104. The projection apparatus 200 in FIG. 2 includes a search module 210, an area module 212, a boundary module 214, and a constraint module 216. In certain embodiments, the modules shown are implemented in the projection apparatus 200. The modules 210-216 may also be distributed between the projection apparatus 200 and a system controller. Note that the markers 108a-c may be of any size relative to the projection areas 106a-c and are depicted in FIG. 2 to be relatively large in comparison with the projection areas 106a-c merely for convenience.

In one embodiment, the search module 210 is configured to search for one or more markers 108 defining one or more projection areas 106 on the surface 104. Thus, in FIG. 2, the search module 210 may be configured to search for one or more of the markers 108a-c that define the projection areas 106a-c. The search module 210 may communicate with a camera or other sensing device in the projection apparatus 200 that allows the search module 210 to analyze the surface 104 and to search for markers 108. For example, the search module 210 may include or may receive input from a camera, a scanner, a radio frequency identifier ("RFID") detection device, a global positioning system ("GPS") unit, or other device to determine a location of a projection apparatus 200 in relation to a projection surface 104 and to find one or more usable projection areas 106 on the surface 104. The search module 210 may use the camera to scan the surface 104. In one embodiment, the search module 210 searches for a marker 108 that matches a particular pattern. For example, the search module 210 may be given the pattern corresponding to the marker 108b and searches the markers 108a-c for the marker 108a-c that matches the pattern.

The area module 212 selects a usable projection area from the projection areas 106 on the surface 104. A usable projection area is a projection area 106 that is available as a surface for the projection apparatus 200 to project images onto. The area module 212, in one embodiment, may select the projection area 106b as the usable projection area. The area module 212 may also determine whether a projection area 106 is vacant and not in use by another projector 102. The area module 212 may, in certain embodiments, use a camera or other sensor to scan a projection area 106 and thereby determine whether or not light is being projected on the projection area 106.

In other embodiments, a system controller informs the area module 212 whether or not the projection area 106 is vacant. The area module 212 may also determine whether or not projection is permissible on the particular projection area 106. In certain embodiments, projection may not be allowed on a particular projection area 106. The projection area 106 may be reserved for another user. The projection area 106 may not be intended to be used for projection.

The area module 212, in one embodiment, may select the projection area 106b as the usable projection area if it is both vacant and a location where projection is permitted. In other embodiments, the area module 212 selects the projection area 106b as the usable projection area if the system controller tells the area module 212 to use the projection area 106b. The area module 212 may also be configured to inform the user that there is no usable projection area if all of the projection areas 106 are unavailable.

For example, the area module 212 may select the projection area 106b as a candidate for the usable projection area. The area module 212 may confirm that the projection area 106b is vacant and that projection is permissible on the projection area 106b. If the projection area 106b meets both requirements, the area module 212 may select the projection area 106b as the usable projection area. In one embodiment, a system controller may communicate information to the area module 212 to aid in selecting a usable projection area. The system controller may identify one or more markers 108 that define the usable projection area. For example, the system controller may send the area module 212 the pattern of a marker 108 that is associated with a projection area 106b that is available to be the usable projection area. The system controller may, for example, send the area module 212 the pattern of the marker 108b. The search module 210 may search for a marker 108 matching the pattern and find the marker 108b. In response, the area module 212 may select the projection area 106b associated with the marker 108b as the usable projection area.

In certain embodiments, the area module 212 selects the projection area 106a-c that is physically closest to the projection apparatus 200 as the usable projection area where multiple projection areas 106a-c are available as usable projection areas. For example, the area module 212 may determine that both projection areas 106b and 106c are available and are thus usable projection areas. The projection area 106a may be in use by another projector 102, and may therefore not be a usable projection area. If the projection apparatus 200 is closest to the projection area 106c, the projection area 106c is selected as the usable projection area.

The projection apparatus 200, in one embodiment, may also include a boundary module 214. The boundary module 214 is configured to determine a boundary for the usable projection area. Thus, in FIG. 2, if the projection area 106b is the usable projection area, the boundary module 214 determines the boundary for the projection area 106b. In certain embodiments, the boundary module 214 determines the boundary by exclusively using the markers 108. In FIG. 1, for example, the boundaries defined by the grid-like markers 108 for the projection areas 106a-g may be used. In FIG. 2, the boundaries may not be explicitly shown by the markers 108. In another embodiment the system controller may inform the boundary module 214 what the boundaries are in relation to a particular marker 108. For example, in FIG. 2, the system controller may inform the boundary module 214 that the boundary for the projection area 106b extends from 1 foot to the left of the marker 108b to 1 foot to the right of the marker 108b, and from 1 foot above the marker 108b to 1 foot below the marker 108b.

The constraint module 216, in one embodiment, constrains the projection from the projection apparatus 200 onto the surface 104 within the boundary of the usable projection area once the boundary module 214 determines the boundary. Thus, where projection area 106b is the usable projection area, the constraint module 216 constrains the projection within the boundary of the projection area 106b. In certain embodiments, the constraint module 216 can adjust the angle of the lens and the aperture of the lens for the projection apparatus 200 to constrain the projection within the boundary.

In other embodiments, the constraint module 216 adjusts an image electronically prior to projection through a lens.

The constraint module 216 may use a camera or other sensor to monitor whether the projection is within the boundary. The constraint module 216 may also dynamically compensate for movement of the projection apparatus 200, and thereby maintain the projection within the boundary for the usable projection area when the projection 102 moves. As used herein, dynamically compensating for movement means monitoring for movement and adjusting for it in real time. For example, the projection apparatus 200 may be a wearable device or a hand held device. The user may occasionally shift position, which may cause the position of the projection apparatus 200 to change as well. The constraint module 216 may adjust the angle of the lens to keep the projection within the appropriate boundary even if the projection apparatus 200 shifts. The constraint module 216 may use the camera or sensor to continually monitor the position of the projection relative to the boundary.

Figure 3:
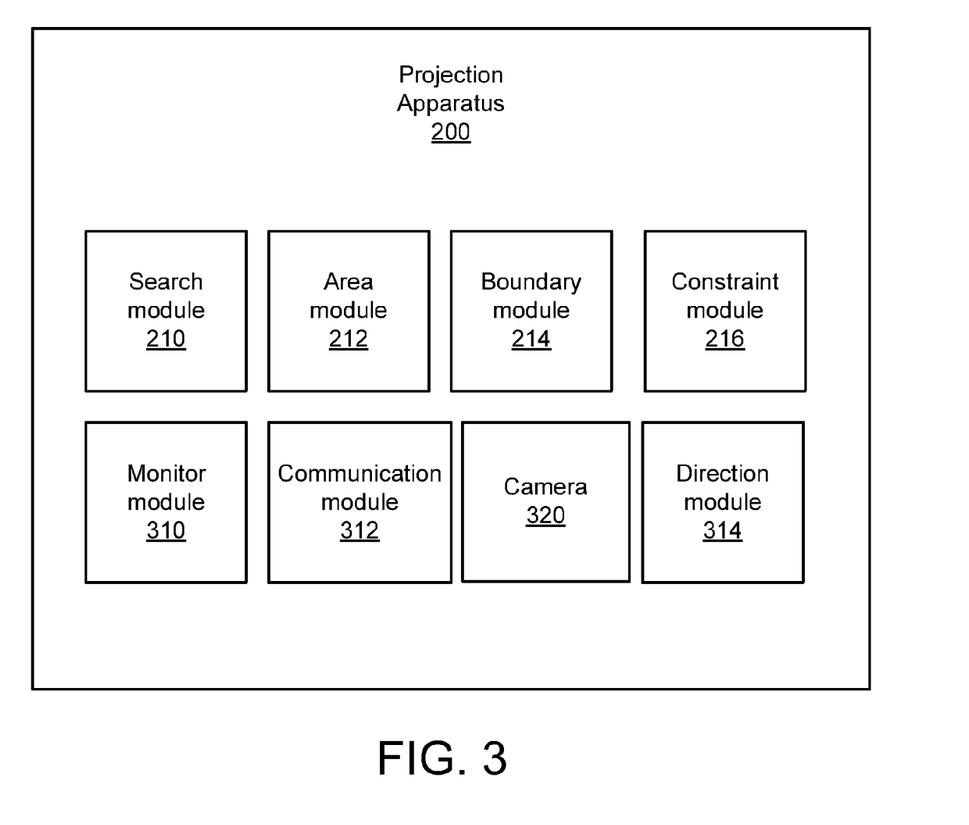
FIG. 3 is a schematic block diagram illustrating an embodiment of a projector.

FIG. 3 shows one embodiment of a projection apparatus 200 that includes a search module 210, an area module 212, a boundary module 214, and a constraint module 216, which are substantially similar to those described above. The projection apparatus 200 includes a monitor module 310, a communication module 312, a direction module 314, and a camera 320. While depicted in FIG. 3 within a projection apparatus 200, in other embodiments the search module 210, the area module 212, the boundary module 214, the constraint module 216, the monitor module 310, the communication module 312, the direction module 314, and the camera 320 may be partially or wholly located external to the projection apparatus 200, for example in a computer, laptop, personal digital assistant ("PDA"), and the like, and are described as being in the projector 102 in the embodiment depicted in FIG. 3 for convenience.

In one embodiment, the monitor module 310 is configured to monitor for changes in the boundary for the usable projection area while usable projection area is in use. The monitor module 310 may monitor the boundary by using the camera 320 to determine whether markers 108 that make up the border (as in FIG. 1) have changed. The monitor module 310 may monitor the boundary by polling the system controller at intervals in order to determine whether the system controller has changed the boundary. The monitor module 310 may monitor the boundary by listening for messages from the system controller informing the monitor module 310 of a change in the boundaries. The constraint module 216 may be further configured to dynamically adjust the projection onto the usable projection area if the monitor module 310 detects a change in the boundary. The constraint module 216 may adjust the projection such that the projection remains within the newly changed boundary.

For example, projection areas 106 may dynamically change based on number of users. If a number of users are projecting on a surface 104 and more users begin to project on the surface 104, a system controller may communicate with projectors 102 of the users and may reduce or rearrange projection areas 106 on the surface 104. In another embodiment, a user may opt to use more than one projection area (e.g. 106 a, 106d, 106g in FIG. 1). The user may, for example, pay for use of more than one projection area, or may be allowed multiple projection area 106 use due to a lack of other users. The monitor module 310 of the projection apparatus 200 of the user may adjust boundaries of projection based on current usage, permissions, available projection areas 106, etc. One of skill in the art will recognize other ways a monitor module 310 may monitor changes in a boundary and adjust a projected image accordingly.

The projection apparatus 200 may also include a communication module 312 that communicates with a system controller that manages the projection areas 106 on the surface 104. The communication module 312 may include software and hardware necessary to establish and maintain a communications connection with the system controller. In certain embodiments, the communication module 312 connects wirelessly with the system controller. The communication module 312 may use a wireless Internet connection, a Bluetooth connection, or other variety of other communications connections.

The projection apparatus 200 may also include a direction module 314. The direction module 314 is configured to direct a user of the projection apparatus 200 to a physical location that is associated with a usable projection area. For example, in FIG. 2, each the projection areas 106a-c may be in use and unavailable. The system controller may notify the direction module 314 of another surface 104 where projection areas 106 are available. The direction module 314 may then direct the user to the usable projection area. In certain embodiments, the direction module 314 determines which of a plurality of available projection areas 106 is closest to the projection apparatus 200, designates the closest available projection area 106 as the usable projection area, and directs the user to the usable projection area.

Figure 4:
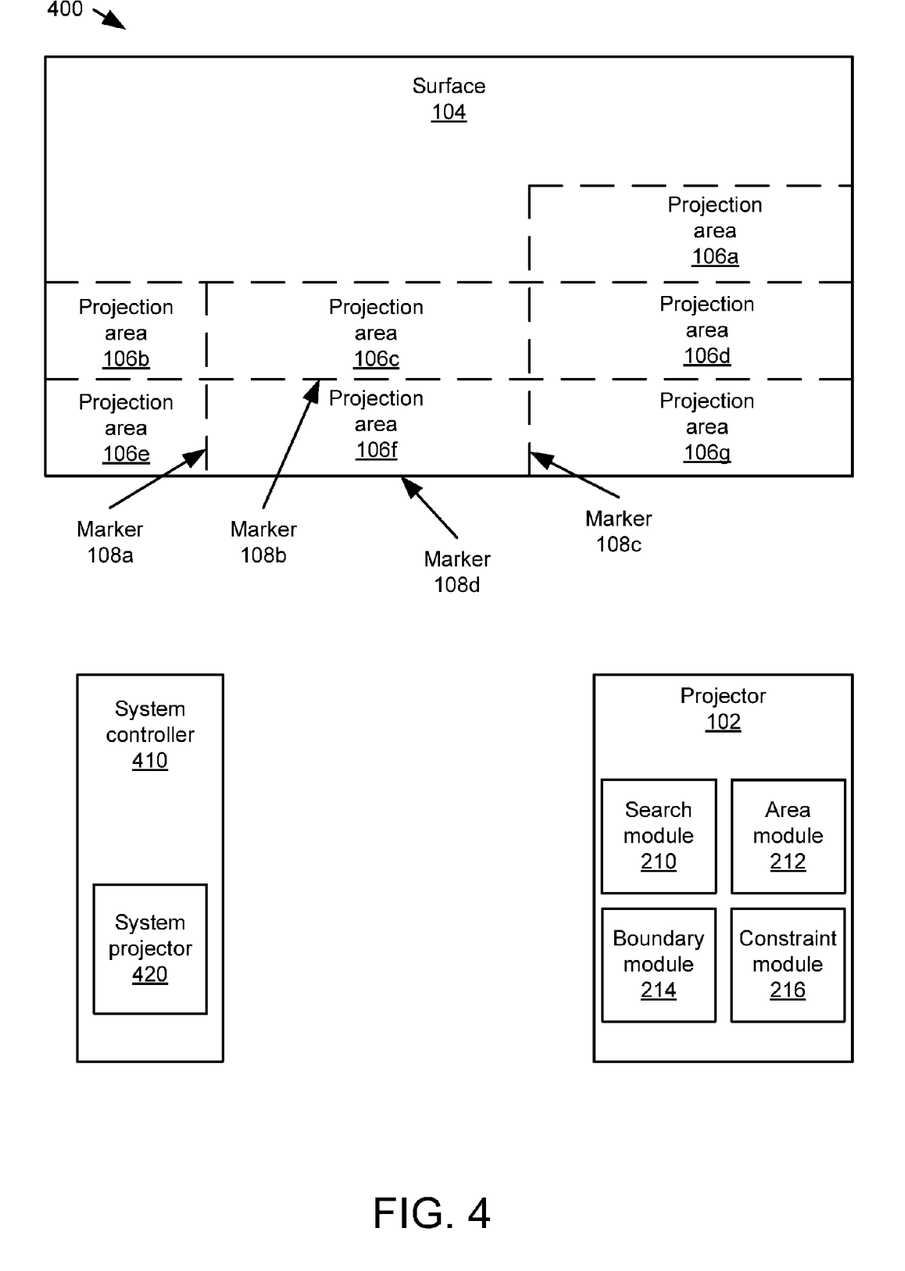
FIG. 4 is a schematic block diagram illustrating an embodiment of a system including a surface, system controller, and a projector.

FIG. 4 shows a system 400 that includes a surface 104 having multiple projection areas 106, a system controller 410, and a projector 102. It is understood that the projector 102 of FIG. 4 is one embodiment of the projection apparatus 200 described above and that the projector 102 depicted in FIG. 4 may be a projection apparatus 200. The projector 102 includes a search module 210, an area module 212, a boundary module 214, and a constraint module 216, which are substantially similar to those described above and may have additional functionality as described in relation to the embodiment of FIG. 4. Other modules, such as those described in relation to FIG. 3 may also be included.

The system controller 410 in the system 400 is configured to manage the projection areas 106. As described above, each of the projection areas 106 is defined by markers 108. In certain embodiments, the system controller 410 includes a system projector 420 that projects the markers 108 onto the surface 104. In such embodiments, the system controller 410 may adjust the size of the boundaries for the projection areas 106 by altering the display of the system projector 420. In certain embodiments, the surface 104 responds to commands from the system controller 410. For example, the surface 104 may include pathways that can be lit up and thus create markers 108. The system controller 410 may send the surface 104 commands telling the surface 104 which pathways to light.

In certain embodiments, the surface 104 is initially free of markers 108. The system controller 410 may monitor the surface 104 (via camera or other technology) and generate markers 108 only when the system controller 410 detects the presence of a projection on the surface 104. The system controller 410 may adjust the size and locations of the markers 108 (and, thus, the projection areas 106) based on the number of projections on the surface 104.

In other embodiments, the system controller 410 does not include a system projector 420 but instead adjusts the size and location of markers 108 on a digital map. For example, a surface 104 may be completely devoid of markers 108 while the system controller 410 includes a digital map of the surface 104 and the digital map may be divided into projection areas 106 with each assigned a marker 108, which may be a number in a table, address, etc. Each marker 108 may have a projection area (e.g. 106a) that is a set of dimensions on the surface 104. One of skill in the art will understand other ways for a system controller 410 to maintain markers 108 and associated projection areas 106 digitally.

In other embodiments, the system controller 410 senses markers 108 and manages corresponding projection areas 106 by allowing one or more projection areas 106 to be allocated to a user. For example, projection areas 106 may be arranged in a grid and the boundary module 214 may communicate with the system controller 410 to determine a boundary around one or more projection areas 106. The system controller 410 may increase or decrease a number of allotted projection areas 106 based on usage, permissions, payment, etc.

The system controller 410 may also monitor the use of the surface 104. In certain embodiments, the system controller 410 may monitor the number of projectors 102 using the surface 104 at any given time, and map those projectors 102 to particular projection areas 106a-g. The system controller may require that projectors 102 check in with the system controller 410 when they start using a projection area 106a-g, and to check out when they are done using a projection area 106a-g. As described above, the system controller 410 may communicate with the projectors 102 and send messages containing information that identifies the projection area 106a-f that the particular projector 102 is assigned to, and the boundary of the projection area 106a-f.

The search module 210 may search for markers 108 defining a projection area 106 by requesting a usable projection area from the system controller 410. The search module 210 searches for the markers 108 associated with the usable projection area, and the area module 212 selects the usable projection area from the projection areas 106. In certain embodiments, the system controller 410 identifies the markers 108 that define the usable projection area to the area module 212. For example, in FIG. 4, the system controller 410 may determine that the projection area 106f is a usable projection area. The system controller 410 may then instruct the area module 212 to select as the usable projection area the projection area 106 that is bounded by the markers 108a, 108b, 108c, and 108d.

In certain embodiments, the area module 212 initially selects a projection area 106 that it believes is a candidate. The area module 212 may, for example, determine that the projection area 106c is vacant. The area module 212 may request permission from the system controller 410 to use the candidate projection area 106c. If the system controller 410 confirms the choice, the projection area 106c becomes the usable projection area and the projector 102 begins using the usable projection area.

The boundary module 214 determines the boundary for the usable projection area. In the embodiment shown in FIG. 4, the boundary may be defined by the markers 108a-d. The constraint module 216 constrains the projection from the projector 102 within the boundary determined by the boundary module 214. As noted above, the constraint module 216 may adjust the angle and aperture size of the projector 102 to appropriately direct and size the projection.

Thus, in one example (not given by way of limitation), a user enters an airport and turns on his projection-enabled device that includes the projector 102. The projector 102 scans the surface 104 and detects the markers 108a-c. After finding that a projection area 106f is available and thus a usable projection area, the projector 102 adjusts the lens to fit the projection within the boundary of the projection area 106f. If a second user arrives to use the surface 104, the system controller 410 may change the markers 108 to provide a space for the second user. The system controller 410 may assign the second user to a different projection area 106g without changing the markers 108.

In certain embodiments, the projectors 102 project the markers 108 on the surface 104. In such embodiments, the search module 210 may search for and recognize the markers 108 projected by other projectors 102. The markers 108 projected by a projector 102 may ensure that other projectors 102 do not encroach on its projection. In such embodiments, the markers 108 may not be fixed to any particular location on the surface 104 and may be fixed, instead, to the boundary of the projection.

The constraint module 216 may be configured to ensure that the projection does not encroach on a projection by a second projector 102. The search module 210 may detect the markers 108 projected by the second projector 102 and shrink or move the projection from the projector 102 to ensure that the projector 102 does not put a projection over the projection created by the second projector 102.

Figure 5:
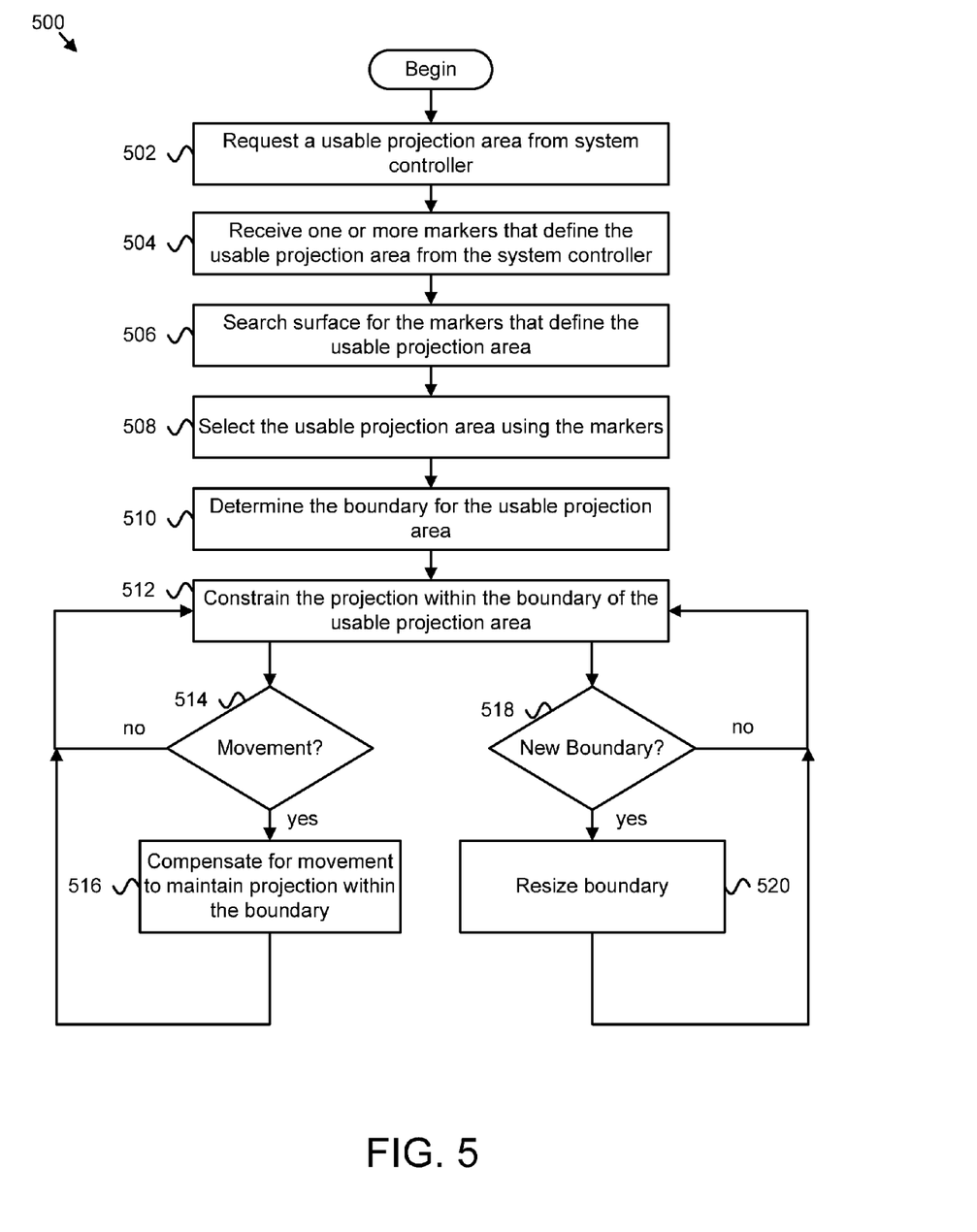
FIG. 5 is a schematic flow chart diagram illustrating one embodiment of a method for managing projection areas on a surface.

FIG. 5 illustrates one embodiment of a method 500 for managing projection areas 106 on a surface 104. In one embodiment, the method 500 begins with requesting 502 a usable projection area from the system controller 410 and receiving 504 from the system controller 410 one or more markers 108 that define the usable projection area. The system controller 410 may send the one or more markers 108 by sending a marker 108 that has the pattern for marker 108b shown in FIG. 2. The system controller 410 may also provide directions to the user of a projector 102 and direct the user to a physical location associated with the usable projection area. For example, if the nearest usable projection area is located on another surface 104, the system controller 410 may direct the user to this surface 104 and provide directions explaining how to get there.

The method 500 may further include searching 506 the surface 104 for the markers 108 sent by the system controller 410 and that define the usable projection area. Referring again to FIG. 2, the search module 210 may search the surface 104 for a marker 108a-c that matches the marker 108b provided by the system controller 410. The method 500 may further involve selecting 508 the usable projection area from the projection areas 106 using the markers 108 that define the usable projection area. Thus, the area module 212 may select the projection area 106b as the usable projection area since the marker 108b matches the marker 108 provided by the system controller 410.

The method 500 may also involve determining the boundary for the usable projection area. As discussed above, the boundary may be indicated by the markers 108 on the surface 104. The boundary may be indicated in data provided by the system controller 410; for example, the system controller 410 may provide information indicating that the marker 108b is associated with a projection area 106b that is a usable projection area, and that the boundary is a circle with a radius of 0.5 feet, with the marker 108b at the center.

The method 500 may also involve constraining 512 the projection within the boundary of the usable projection area. When the projection is constrained, the method 500 may involve monitoring for movement 514 and monitoring for changes in the boundary 518. If there is movement, the method 500 may involve dynamically compensating 516 for the movement, thereby maintaining the projection within the boundary for the usable projection area even when the projector 102 moves. If there is a new boundary, the method 500 may involve dynamically resizing 520 the boundary. The information about the new boundary may be received from the system controller 410. The system controller 410 may send the new boundary information through a data packet. The system controller 410 may send the new boundary information by adjusting the positions of the markers 108.

The embodiments may be practiced in other specific forms. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An apparatus comprising:
   a search module configured to search for one or more markers defining one or more projection areas on a surface;
   an area module configured to select a usable projection area from the one or more projection areas on the surface;
   a boundary module configured to determine a boundary for the usable projection area; and
   a constraint module configured to constrain a projection from a projector onto the surface within the boundary of the usable projection area in response to the boundary module determining the boundary of the usable projection area, wherein the area module is further configured to determine that the usable projection area is vacant and not in use by another projector; and determine that projection is permissible on the usable projection area.

2. The apparatus of claim 1, further comprising a monitor module configured to monitor for a change in the boundary for the usable projection area.

3. The apparatus of claim 2, wherein the constraint module is further configured to dynamically adjust the projection in response to the monitor module detecting the change in the boundary for the usable projection area.

4. The apparatus of claim 1, wherein the constraint module is further configured to dynamically compensate for movement of the projector and thereby maintain the projection within the boundary for the usable projection area when the projector moves.

5. The apparatus of claim 1, further comprising a communication module configured to communicate with a system controller, wherein the system controller manages use of the one or more projection areas on the surface.

6. The apparatus of claim 5, wherein the area module selects the usable projection area using information provided by the system controller.

7. The apparatus of claim 6, wherein the information provided by the system controller identifies one or more markers defining the usable projection area.

8. The apparatus of claim 1, wherein the search module comprises a camera for searching for the one or more markers.

9. The apparatus of claim 1, wherein the area module is further configured to select a usable projection area that is closest to the projector in response to the area module determining that a plurality of the one or more projection areas on the surface are usable projection areas.

10. The apparatus of claim 1, wherein the area module is further configured to notify a user of the projector that there is no usable projection area in response to determining that each of the one or more projection areas is unavailable.

11. The apparatus of claim 1, further comprising a direction module configured to direct a user of the projector to a physical location associated with the usable projection area.

12. The apparatus of claim 1, wherein the search module, area module, boundary module, and constraint module are realized in the projector.

13. A system comprising:
   a system controller configured to manage a plurality of projection areas on a surface, wherein each of the plurality of projection areas is defined by one or more markers;
   a search module configured to search for the one or more markers;
   an area module configured to select a usable projection area of the plurality of projection areas, wherein the system controller identifies to the area module the one or more markers that define the usable projection area;
   a boundary module configured to determine a boundary for the usable projection area as defined by the one or more markers that define the usable projection area; and
   a constraint module configured to constrain a projection from a projector onto the surface within the boundary for the usable projection area in response to the boundary module determining the boundary for the usable projection area, wherein the area module is further configured to determine that the usable projection area is vacant and not in use by another projector; and determine that projection is permissible on the usable projection area.

14. The system of claim 13, the system controller further comprising one or more projectors that project the one or more markers onto the surface.

15. The system of claim 13, wherein the one or more markers are permanent features of the surface.

16. A method for managing projection areas on a surface, the method comprising:
   requesting a usable projection area from a system controller;
   receiving from the system controller one or more markers that define the usable projection area;
   searching a surface for the one or more markers that define the usable projection area;
   selecting the usable projection area from one or more projection areas on the surface using the one or more markers that define the usable projection area;
   determining that the usable projection area is vacant and not in use by a projector;
   determining that projection is permissible on the usable projection area; determining a boundary for the usable projection area; and constraining a projection from another projector onto the surface within the boundary of the usable projection area.

17. The method of claim 16, further comprising dynamically compensating for movement of the projector and thereby maintaining the projection with the boundary for the usable projection area when the projector moves.

18. The method of claim 16, further comprising dynamically resizing the boundary in response to receiving a new boundary from the system controller.

19. The method of claim 16, further comprising directing a user of the projector to a physical location associated with the usable projection area.

* * * * *